United States Patent [19]
Arnold

[11] Patent Number: 5,490,562
[45] Date of Patent: Feb. 13, 1996

[54] SUBSEA FLOW ENHANCER

[75] Inventor: Kenneth E. Arnold, Houston, Tex.

[73] Assignee: Paragon Engineering Services Incorporated, Houston, Tex.

[21] Appl. No.: 384,924

[22] Filed: Feb. 7, 1995

[51] Int. Cl.[6] ............................................. E21B 43/24
[52] U.S. Cl. ................................. 166/267; 166/302
[58] Field of Search .......................... 166/267, 357, 166/266, 302

[56] References Cited

U.S. PATENT DOCUMENTS

| | | | |
|---|---|---|---|
| 4,284,139 | 8/1981 | Sweany | 166/267 |
| 4,480,691 | 11/1984 | Herter et al. | 166/267 |
| 4,664,190 | 5/1987 | Carpentier | 166/267 |
| 4,741,398 | 5/1988 | Goldsberry | 166/266 |
| 5,109,928 | 5/1992 | McCants | 166/266 |
| 5,149,344 | 9/1992 | Macy | 166/267 X |
| 5,236,605 | 8/1993 | Warneko | 166/267 X |
| 5,390,740 | 2/1995 | Woerheide | 166/266 |

*Primary Examiner*—Frank S. Tsay
*Attorney, Agent, or Firm*—Conley, Rose & Tayon

[57] ABSTRACT

The present invention is for a subsea hydrocarbon recovery device comprising a means for separating a composite hydrocarbon stream into a gas and liquid stream and independent means for recovering each stream. The device is comprised of a separator, a gas recovery pipeline and a liquid recovery system. The separator separates a composite hydrocarbon stream from a well into vapor and liquid phases. The liquid hydrocarbon recovery system is comprised of a circulating loop into which the liquid hydrocarbon stream is introduced for recovery. The liquid steam flows through a pressure increasing device into a circulating loop which brings the recovered hydrocarbon to the surface. Physical parameters of the circulating liquid can be controlled to prevent or eliminate paraffin accumulations.

13 Claims, 2 Drawing Sheets

5,490,562

SUBSEA FLOW ENHANCER

BACKGROUND OF THE INVENTION

A. Field of the Invention

The present invention relates to a method and apparatus for efficient recovery of hydrocarbons from subsea wells. More specifically, the apparatus operates to reduce the formation of hydrates, reduce backpressure on the well and prevent paraffin formation in the hydrocarbon recovery process.

B. Description of the Related Art

Recovery of oil and gas requires removal of the hydrocarbons from their subterranean location and transport to processing plants or storage containers. Offshore hydrocarbon production is particularly complicated by the traverse of the hydrocarbons from the sea bed to the sea surface because the additional backpressure on the well reduces the flow of hydrocarbons to the surface and because the hydrocarbons tend to cool as a result of heat loss to the surrounding sea water. When the unrefined hydrocarbons cool, solids tend to form on the inner walls of recovery pipelines, obstructing hydrocarbon flow and decreasing recovery efficiency. If cooling is extreme, as when the flow is temporarily stopped, the flowlines may become completely plugged.

Solids that form in hydrocarbon recovery pipelines are of two types, paraffins and hydrates. Hydrates are solids that form in gaseous hydrocarbon and water mixtures when the temperature falls below the hydrate formation temperature. Hydrate formation temperatures vary with pressure and the properties of the gas. Typical hydrate formation temperatures range from about 60° F. to about 80° F. at pressures normally present in hydrocarbon production pipelines. Paraffins are solids that form when oil cools below its "cloud point". In some cases the cloud point temperature can be over 100° F. Since typical deep sea water temperatures range from about 30° F. to 50° F., heat exchange of hydrocarbons with cooler sea water can result in undesirable solid formation, particularly at low flow rates.

A variety of techniques can be used to prevent solid formation. For example, insulation of hydrocarbon recovery pipelines prevents heat exchange with sea water. However, it is well known that natural flow rates vary between different wells and for individual wells over time. Insulation alone is insufficient to prevent problems with paraffin formation when hydrocarbon flow through a recovery line is very slow or when there is no flow. Furthermore, circumstances may demand that the well be temporarily shut down, for example when a hurricane passes or when mechanical problems occur. If the flow rate slows enough to allow the hydrocarbon to cool below its hydrate formation temperature or cloud point, then solids will accumulate in the pipelines and hydrocarbon recovery efficiency will be reduced. It would be prohibitively expensive to insulate pipelines adequately enough to prevent solid formation under all circumstances. Furthermore, insulation provides no benefit in restarting hydrocarbon flow through obstructed pipelines.

Solid hydrate formation can also be inhibited by chemical additives such as methanol, ethylene glycol and the like, which are introduced directly into the hydrocarbon recovery pipelines. However, the cost of these inhibitors may make their continuous use uneconomical.

Another strategy for preventing solid formation involves adding heat to the recovered hydrocarbon. An example, of one such strategy is disclosed in U.S. Pat. No. 4,679,598, which describes a method of transporting subsea gas through a tube bundle. The bundle provides an insulating external casing, an internal heating tube for carrying a heated medium and at least one hydrocarbon production pipeline. Heating fluid provided by an external source is circulated through the bundle and is transmitted into the production flowline. However, this invention does not reduce backpressure on the well.

When solids form in a pipeline, one technique for clearing the line is "hot oiling the well". This is a method of melting out the solids by introducing heated oil from the surface into a partially occluded pipeline. The hot oil melts away the blockages. A system of this type is described in U.S. Pat. No. 4,911,240. This patent discloses an oil heater and storage tank and a pipeline leading from the storage tank to the wellhead. Hot oil is introduced into the wellhead, where it passes into the well string and dissolves paraffins and other deposits. The "hot oiling" process interrupts production and does not prevent the build up of paraffins in an ongoing manner. The oil recovery industry has not yet found a way to "hot oil" a well without interrupting hydrocarbon recovery. A process such as this would be more useful if it could be carded out during production and in a way that reduces backpressure on the well.

None of the previously described techniques can be used to reduce backpressure on a well. However, a variety of techniques are known to reduce back pressure on a well. For example, downhole pumps can be used to pump oil to the surface. The use of downhole pumps is described in U.S. Pat. No. 4,967,843, which discloses the use of a pump employed near the bottom of the well to force composite hydrocarbons (hydrocarbons containing gas and liquid) to the surface. The pump, which is powered by a pressurized fluid line drives hydrocarbons up through the inner one of a pair of concentric tubes. The annular space between the tubes is used to send the drive fluid to the pump. The utility of this invention is limited by the cooling of the hydraulic fluid which is recirculated from the platform down to the pump. Mixing the cooled fluid with crude oil, as taught, could stimulate the production of both hydrates and paraffin in the composite hydrocarbon flowline. In addition, the recirculated hydraulic fluid surrounds the inner flowline and operates as a heat sink, drawing heat from the newly recovered oil.

Another, more sophisticated recovery technique is disclosed in U.S. Pat. No. 4,705,114, which describes directing a composite hydrocarbon stream along the sea floor to directly beneath a platform where the stream is separated into gas and liquid streams. The gas and liquid streams are introduced into the annulus of a riser comprising dual concentric pipes. The gas flows upward through the annulus of the riser to the platform, where it is collected. The liquid hydrocarbon pool flows down the annulus by gravity and enters the sump of a well beneath the riser tube. A downhole pump located in the sump then forces the liquid hydrocarbon to the surface through the inner pipe of the riser. The invention provides for recirculation of recovered hydrocarbon which may be required to allow the pump to maintain in continuous operation when the recovered oil is depleted from the sump. This system offers an advantage in that separating gas from liquid eliminates problems with hydrate formation in the liquid dominated lines, while paraffin formation is not a problem in the gas dominated line. However, by removing the gas from the crude oil, it is more likely that paraffins will form in the liquid. Moreover, introducing the liquid into the lower section of the riser pipe where the surrounding sea water is the coolest and requiring it to drain into the sump of the inner pipe of the riser may allow the hydrocarbon liquid to cool to below the cloud point.

Another method for reducing backpressure on the well is taught in U.S. Pat. No. 5,199,496. Seawater flows into an aspirator that is connected to a oil production manifold. The oil is driven to a riser which utilizes a gas lift to urge the oil/sea water mixture to the surface. While this technology may be useful in reducing backpressure on the well, mixing of cold sea water with a heavy oil could stimulate paraffin and hydrate formation and consequent pipe blockages. Furthermore, sea water is not normally considered compatible with water produced from hydrocarbon pools because these mixtures have a propensity to form scale inside the hydrocarbon recovery lines. Leakage of the check valve by the seawater intake port, which could occur after substantial scale accumulation, could allow hydrocarbons to leak directly into the sea.

U.S. Pat. No. 4,154,297 describes a gas lift apparatus that includes a heat exchanger for exchanging heat from well fluids to the gas injected into a well. The invention prevents problems of local cooling caused by the rapid depressurization of the gas near the gas jet. This cooling could lead to solid formation around the gas jet and clogging of the pipeline. However, the invention operates by removing heat from the recovered hydrocarbon stream, thereby causing the same net loss of heat from these liquids.

The inventions considered previously provide advantages either in reducing the backpressure on the well or in maintaining the elevated temperature of the recovered hydrocarbons. However, a system that operates to reduce backpressure on the well while at the same time eliminating problems with solid formation would be particularly useful. Furthermore, the system should not be difficult to restart after extended shutdowns.

SUMMARY OF THE INVENTION

The present invention decreases backpressure on the well and minimizes the formation of hydrates and paraffins. Furthermore, hydrocarbon recovery can easily be restarted after the well is shut in for extended periods.

The invention provides these advantages by separating the composite hydrocarbon stream into a vapor stream and a liquid stream soon after it emerges from beneath the sea floor, segregating these streams and providing for independent recovery of each stream. The vapor stream passes from the separator through a gas flowline to the platform where it is collected. The liquid hydrocarbon stream passes from the separator through a pressure increasing device where it exits into a liquid flowline. The liquid flowline carries the recovered oil to the platform where it is recovered. In a preferred embodiment, a recycle flowline originates on the platform and carries recycle liquid to the point where it is mixed with the recovered liquid hydrocarbon stream and enters the liquid flowline which carries the mixture to the platform.

In alternative embodiments, recovered hydrocarbons are introduced into the liquid flowline through an eductor or a hydraulic pump or similar means. When an eductor is used, the recycle liquid passing through the device creates a low pressure region that draws the recovered liquid hydrocarbon stream into the liquid flowline. When an hydraulic pump is used, it is preferable to configure the recycle flowline so as to power the pump. The pump is used to force the recovered liquid hydrocarbon stream into the liquid flowline. Besides an hydraulic pump or eductor any device is suitable to introduce the recovered liquid hydrocarbon stream into the liquid flowline so long as it increases the pressure of the liquid draining the separator so that it can flow into the liquid flowline. In this manner the pressure in the separator is determined by the sum of the pressure due to the head of gas in the gas line flowing to the platform at the surface, the pressure drop in the gas piping from the separator to the processing equipment on the platform and the operating pressure of the gas processing equipment on the platform. This will always be much lower than the pressure required downstream of the pump to overcome the sum of the head of liquid in the liquid line flowing to the platform at the surface, the pressure drop in the liquid piping from the separator to the processing equipment on the platform and the operating pressure of the liquid processing equipment on the platform.

A liquid level sensor disposed on the separator maintains the liquid level in the separator. The liquid controller could be a standard float device, a capacitance or inductance device, a nuclear device, or any of the many devices commonly used to sense gas/liquid interfaces. In the preferred embodiment, a nuclear device is used which can be mounted on the outside of the separator and replaced using a Remote Operated Vehicle (ROV).

The present invention eliminates problems with hydrate formation that are common in other deep sea gas recovery systems. Those with skill in the hydrocarbon recovery arts can appreciate that hydrate formation is not problematic in the liquid dominated end of the recovery system, since the volume of gas that is present in liquid flowlines is negligible. Small quantities of gas may evolve as the liquid progresses to the sea surface and the pressure on the liquid passes below its bubble point. However, the potential for significant hydrate formation under these circumstances is negligible because of the small volume of gas that can form in the liquid dominated segment of the present invention. When desired, gas formation in liquid flowlines can be reduced further by increasing pressures in relevant liquid flowlines. Pressure is increased by forcing a backpressure on the receiving end.

In the gas dominated segment of the present invention, hydrate formation is limited by the availability of moisture. Because the gas is separated and permanently segregated from the liquid stream early in the recovery process, the water which is produced from the reservoir or which condenses from the gas due to cooling from reservoir to separator conditions remains in the excluded liquid phase and has no subsequent opportunity to reenter the gas dominated end of the system. The only water that exists in the gas line is the small amount of water vapor that condenses due to cooling from separator temperature to temperature at the end of the pipeline. Since water is a component of hydrates, .the limited quantity of moisture in the gas limits the quantity of hydrate that can form. In addition, since the quantity of condensed water is low after separation, only a small amount of hydrate inhibitor needs to be added to lower the hydrate formation temperature below the temperature at the end of the pipeline during normal flow conditions.

In another embodiment, insulation is added to the gas recovery flowline so that the temperature at the end of the flowline is above the hydrate formation temperature at design flowrates. If the line must be shut down for long periods of time, only a small amount of hydrates will form and these will not typically cause plugging on restart. By insulating the line, the use of hydrate inhibitors during flowing conditions may be eliminated. However, the cost of installing an insulated line may be significantly greater than the over-life cost of injecting a small amount of hydrate inhibitor in the preferred embodiment.

When the flow stops for an extended time, no amount of insulation can prevent thermal equilibration of the gas with surrounding sea water. Under these circumstances, more substantial quantities of hydrates may form and the advantage of separating produced liquids from the gas prior to the pipelines to lower the moisture content in the gas recovery pipeline of the present invention is even more important.

Hydrates that do form in the gas flowline during long periods of shutdown of the present invention can be eliminated, if necessary, by reducing the flowline pressure prior to startup. At a pressure of one atmosphere hydrates rapidly melt above a temperature of 32° F. Alternatively, a volume of methanol or ethylene glycol or other hydrate inhibitor can be introduced into the gas recovery flowline prior to shutdown to inhibit the formation of hydrates during shutdown.

In still another embodiment, the gas and liquid pipelines are bundled with the recycle line and all are encased in insulation. By heating the recycle fluid and circulating recycle fluid back to the platform through the liquid line, hydrates which form during extended shutdowns can be melted prior to restarting production. Although it is high unlikely that this capability will be needed, the nature of subsea systems is such that it is comforting to the operator to know that there is fall safe method to melt hydrate plugs which occur for unforseen reasons.

The present invention also avoids the problems caused by paraffin formation that are common in other deep sea recovery devices. Those with skill in the art can appreciate that paraffin formation is not problematic in the gas dominated end of the recovery system, since paraffins are present only in the heavier hydrocarbon components present in the liquid line. Paraffin formation is minimized in the liquid dominated end of the recovery system by introducing the recovered hydrocarbon stream into the liquid flowline soon after it exits the separator. Liquid from the platform is also introduced into the liquid flowline so that there is a sufficient flowrate to allow recovery before the liquid hydrocarbon stream cools to below the cloud point.

In an alternate embodiment, the circulating liquid is heated so that it imparts heat to recovered liquid hydrocarbon stream when they are mixed. The flowrate of the circulating liquid is adjusted to allow recovery of liquid hydrocarbons before they cool to below the cloud point. With this system, it is possible to produce well fluids at flowrates below 10% of design and still have the fluid temperatures at the end of the pipeline be above the cloud point. In alternate embodiments, insulation can be added to the flowlines to minimize heat exchange with sea water and chemical inhibitors of paraffin formation may be added to the recycle liquid.

Because of the high cost to insulate pipelines, it may be better to allow some amount of paraffins to deposit on the wail of the pipeline and "pig" the line periodically to clear the deposit. It has been found that if flow rates are kept high by recirculating sufficient liquid, the larger shear rates that exist at the wall of the pipe help erode the solid that deposits, thereby slowing the rate of buildup considerably. In addition, the presence of substantial quantities of water (at least 10 to 20%) in the flow stream softens the deposit and makes it erode more easily and the removal of gas from the wellstream by the separator reduces the shear strength of the paraffins that build up. Paraffins that accumulate in degassed liquid hydrocarbon tend to be more easily scraped off the sides of the pipe than when the hydrocarbon stream has not been degassed.

The recycle line helps maintain high flow rates (shear forces), allows the operator to assure there is sufficient water in the fluid to soften the deposit, and allows for pigs to be easily launched from the platform, flow to the subsea well and return through the liquid line, scraping off any small buildup of paraffin.

Also relevant to the present invention is Applicant's discovery that paraffins formed from mixtures of recovered liquid hydrocarbons by cooling below the cloud point in shut-in pipelines have a low shear strength if the hydrocarbons are in a mixture containing 20–60% water. This shear strength is low enough that even if a paraffin plug forms on extended shut-in, it will be easily overcome with pipeline pressures only 1.5 to 2.0 times normal flowing pressure. The optimal hydrocarbon/water ratio depends upon the characteristics of the recovered liquid hydrocarbon and is determined by measuring the shear strength of cooled sample mixtures containing a range of water concentrations by standard means. In the preferred embodiment, the present invention is configured so that the water content of the liquid in the return flowline is maintained at this water concentration. Under these conditions the flowline can be operated or shutdown without the accumulation of intractable paraffins.

Typically, the liquid pumped into the recycle flowline consists of water produced from the well itself. However, liquid hydrocarbons or water/hydrocarbon mixtures may also be recycled through the flowlines. The advantage of minimizing paraffin shear strength can be realized by introducing a liquid with the appropriate composition of water and liquid hydrocarbon. This composition depends upon the flowrate of recycle fluid, the flowrate of recovered liquid hydrocarbon and the amount of water required to minimize paraffin shear strength in the return line.

In the embodiment where the gas and liquid lines are bundled with the recycle line and all are encircled by the same insulation, recycled fluid can be heated to assure that even at flow rates less than 10% of design, liquid arriving at the end of the pipeline can be kept above the cloud point with only small flowrates of recycle fluid.

Restarting the flow in liquid flowlines can be accomplished by pumping recycle fluid through the circulation flowline, since the shear strength of any paraffin plugs which forms will be low. The introduction of heated liquid into the recycle flowline can be used to melt out residual paraffins in the flowline.

In most instances, heat contained in the tubing, casing, tree, separator and tubing fluids will keep paraffins from forming in the tubing, wellhead, and separator unless shutdown times are extremely long or the crude oil has a very high cloud point. In these instances, some of the recycle stream can be directed into the tree to melt paraffins.

The unique circulating liquid flowline of the present invention provides several additional advantages. For example, the flowrate of liquid through this flowline is controlled through pumps that are located on the platform. Location of the pumps on the platform, as opposed to underwater, facilitates maintenance and reduces operating costs. In addition, the flowline can easily be adapted to facilitate regular pigging. Incorporation of the circulating liquid flowline also facilitates developing alternative configurations for reinjecting produced water back into the reservoir. This helps to maintain the natural reservoir pressure.

Water prepared on the platform for reinjection into the reservoir flows through the circulating liquid line. Part of this flow could be diverted to the liquid flowline to maintain flowrate and water cut in the liquid line and the rest would enter injection wells for flow into the reservoir. If a hydraulic pump were used to pump the produced liquid, the water being injected into the wells would provide the energy to drive the hydraulic pump. If an eductor were used, the water recirculated to the liquid flowline would provide the energy for the liquid flowline.

In another embodiment, a pressure sensing device monitors back pressure in the flowlines and controls valves that flush the system with heated liquid to melt out accumulated paraffin.

In yet another embodiment, an electric pump is disposed on the liquid flowline that drains the separator. This pump drains liquid from the separator into the liquid flowline. In this embodiment, the advantages of the circulating liquid flowline are realized in a system that has the capability of delivering a higher liquid head and back pressure on the well is also reduced. The platform contains a variety of equipment well known in the art of hydrocarbon recovery for operation of the present invention, such as separators for separating hydrocarbon from water, pumps, heaters and monitoring equipment.

Other objects and advantages of the invention will appear from the following description.

BRIEF DESCRIPTION OF THE DRAWINGS

For a detailed description of a preferred embodiment of the invention reference will now be made to the accompanying drawings wherein.

DETAILED DESCRIPTION OF THE INVENTION

Figure 1:
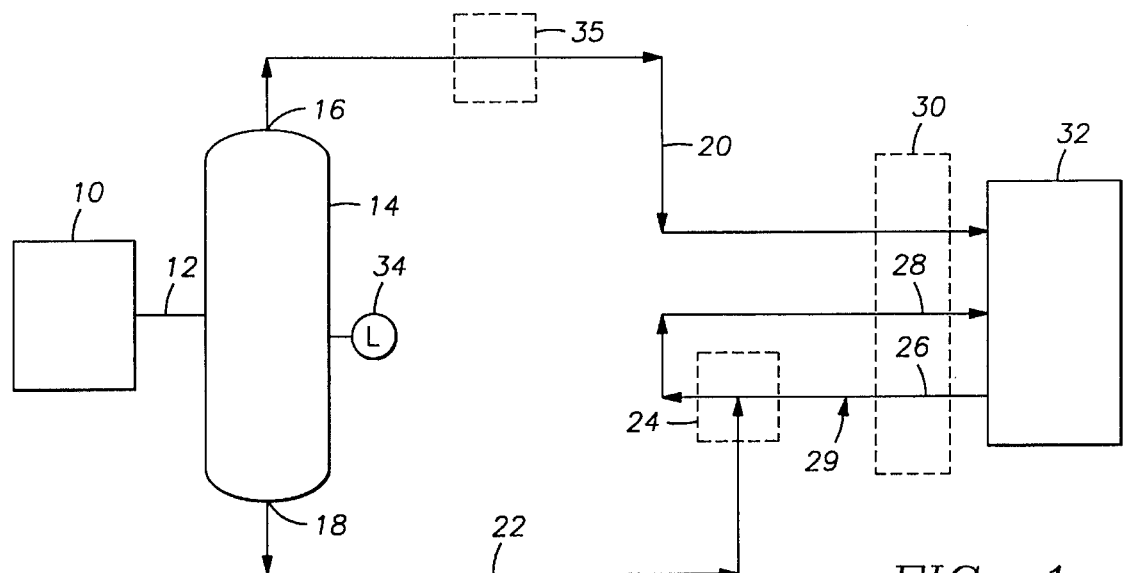
FIG. 1 is a schematic diagram of the present invention; and would be configured to recover petroleum products from a producing well utilizing a subsea separator and a recirculating liquid line.

Referring to FIG. 1, the present invention is shown in relation to a conventional subsea wellhead 10. A composite hydrocarbon stream is produced through wellhead 10 from a subsea well. Wellhead 10 is connected by a relatively short segment of pipe 12 to separator 14. Pipe 12 is of a suitable length and diameter to span the distance between separator 14 and wellhead 10 without producing excessive backpressure on the well. Normally, this distance is between 10 and 50 feet, although longer distances are sometimes encountered. Pipe 12 is joined to separator 14 and the wellhead 10 in such a way as to maintain a liquid seal under the temperatures and pressures typically associated with wells, a characteristic common to all connections in the present system. Such flowline connections can be made by methods that are well known in the subsea liquid hydrocarbon production art.

A variety of separators can be used to accomplish the separation contemplated in the present invention. For example, basic separator design is explained in SURFACE PRODUCTION OPERATIONS, Volume I, Design of Oil and Water Handling Systems, co-authored by the inventor. Various centrifugal type separators could also be employed, such as that explained in "A Simple Model for the Efficiency of Rotary Separators" by Alhanati, J. S., et al. (SPE 1994), "Evaluation of the Performance of a New Upflow Design, by Aretz, H. J., 1993, published in SPE INTERNATIONAL, "New Separator Cuts Motion Effects on Floating Facilities" OCEAN INDUSTRY, June 1992, and the separator described in the aforementioned U.S. Pat. No. 4,705,114. The composite hydrocarbon stream is separated into a vapor hydrocarbon stream and a liquid hydrocarbon stream in separator 14.

The separator 14 is connected to a vapor flowline 20 at an exit port 16. In the preferred embodiment, flowline 20 is not insulated to prevent loss of heat to the surrounding sea water. The hydrocarbon vapor stream exits separator 14 through exit port 16 and flows to the surface through vapor flowline 20, from which it is collected for downstream processing. In one embodiment, vapor flowline 20 leads to a platform 32, which is above the sea level. In this embodiment, vapor is collected for downstream processing on platform 32 by standard means.

The separated liquid hydrocarbon stream exits separator 14 through an exit port 18 and flows through a pipe 22. At its opposite end, pipe 22 is operably connected to an introducing means 24 for introducing the recovered liquid hydrocarbon stream into a liquid flowline 28. Together, recycle line 26, introducing means 24 and liquid flowline 28 form a circulating loop 29.

Recycle flowline 26 extends between platform 32 and introducing means 24. Recycle liquid is pumped into recycle flowline 26 from platform 32. Recycle liquid passes through introducing means 24, where it is joined by the recovered liquid hydrocarbon stream. The mixed liquid flows from introducing means 24 through liquid flowline 28, from which it is collected for later processing. In the preferred embodiment, liquid flowline 28 returns the mixed liquid to platform 32.

Platform 32 is suitably equipped to separate recovered hydrocarbon from produced water and is capable of storing or down stream processing the recovered hydrocarbons and water. Platform 32 is configured to introduce water, liquid hydrocarbon or selected mixtures of water and liquid hydrocarbon into recycle line 26 to maintain sufficient flowrates in liquid flowline 28 and a high enough water cut so that paraffin deposition can be eliminated or minimized for easy pigging. Pigs can be launched from platform 32 through recycle line 26 and liquid flowline 28, and be recovered on platform 32. It is also possible to provide valves so that pigs launched from platform 32 can be routed through gas flowline 20. In a preferred embodiment, the liquid in the return flowline is maintained between 20 to 60 percent water. At this ratio, flow in the liquid flowline 28 can be completely shutdown and any paraffins that form will have a low shear strength, facilitating restarts after shutdown.

In an alternative embodiment, flowlines 28, 20 and 26 can be bundled, as shown in phantom at 30, so that the bundled flowlines are in thermal contact. They can be bundled along part or all of their length as desired. Hot liquid in one flowline provides heat to cooler flowlines in this configuration. In this embodiment, platform 32 is equipped with a means to heat the recycle fluid before pumping it into recycle line 26. Platform 32 is equipped to monitor the temperature of the liquid hydrocarbon stream as it exits liquid flowline 28. This temperature is maintained above the cloud point by heating recycle liquid introduced into the recycle line 26 or by increasing the flow in recycle line 26.

In a preferred embodiment, introducing device 24 is an eductor system 25 controlled by level sensor 34. The eductor system can consist of one or more eductors operating in parallel.

Figure 2:
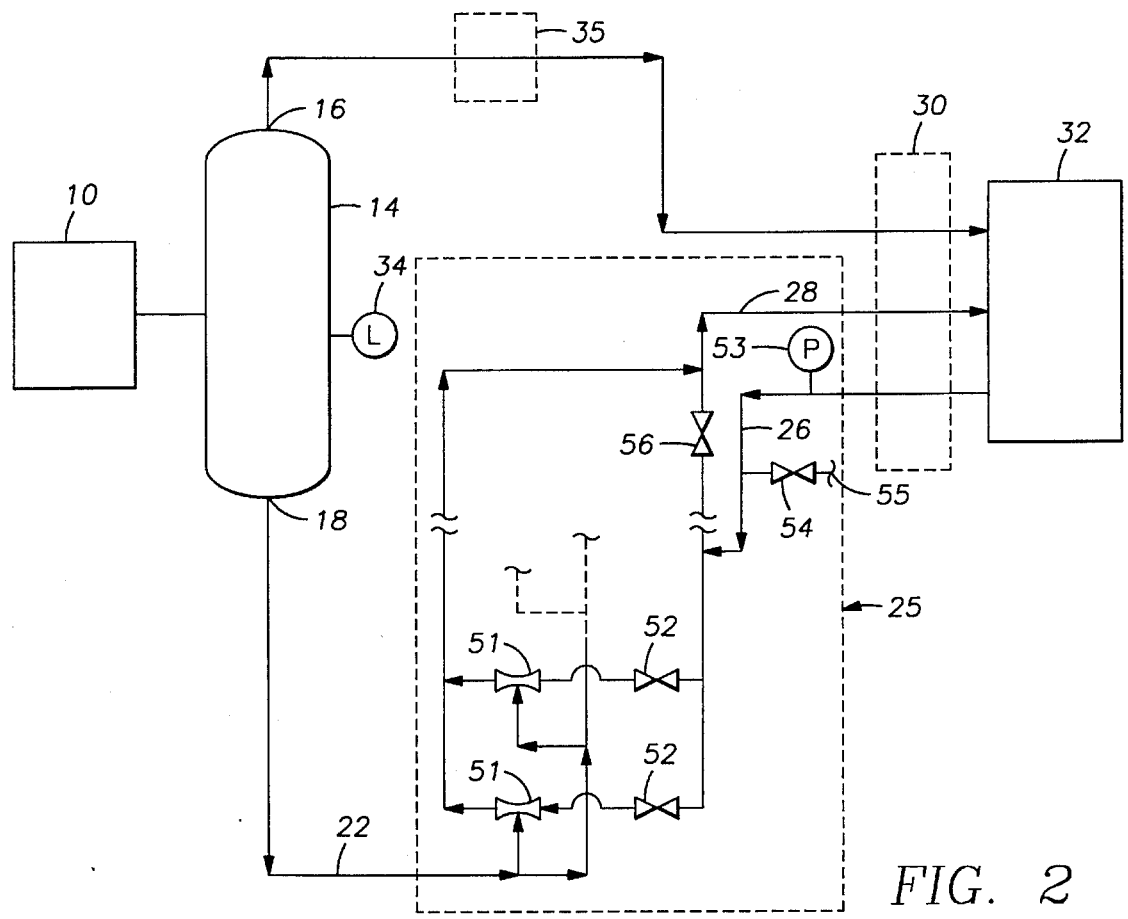
FIG. 2 is a schematic diagram of an alternative embodiment of the invention wherein eductors introduce recovered liquid hydrocarbon into a liquid flowline.

As shown in FIG. 2, recycle liquid passes through at least one eductor 51, creating an area of low pressure which allows flow from pipe 22 to enter the eductor and flow into pipe 28, even though the pressure in pipe 22 is lower than the pressure in pipe 28. As illustrated in FIG. 2, there may be as many parallel eductors 51 as are required to maintain the level in the separator.

The level sensor 34 directs liquid from recycle line 26 into eductors 51 by opening and closing valves 52. Pressure sensors 53 on recycle line 26 send a signal to valve 54 to allow excess liquid to be discharged to the sea through line 55 (if the liquid in recycle line 26 meets applicable environmental criteria), or injected into wells for waterflood purposes through line 55.

Figure 3:
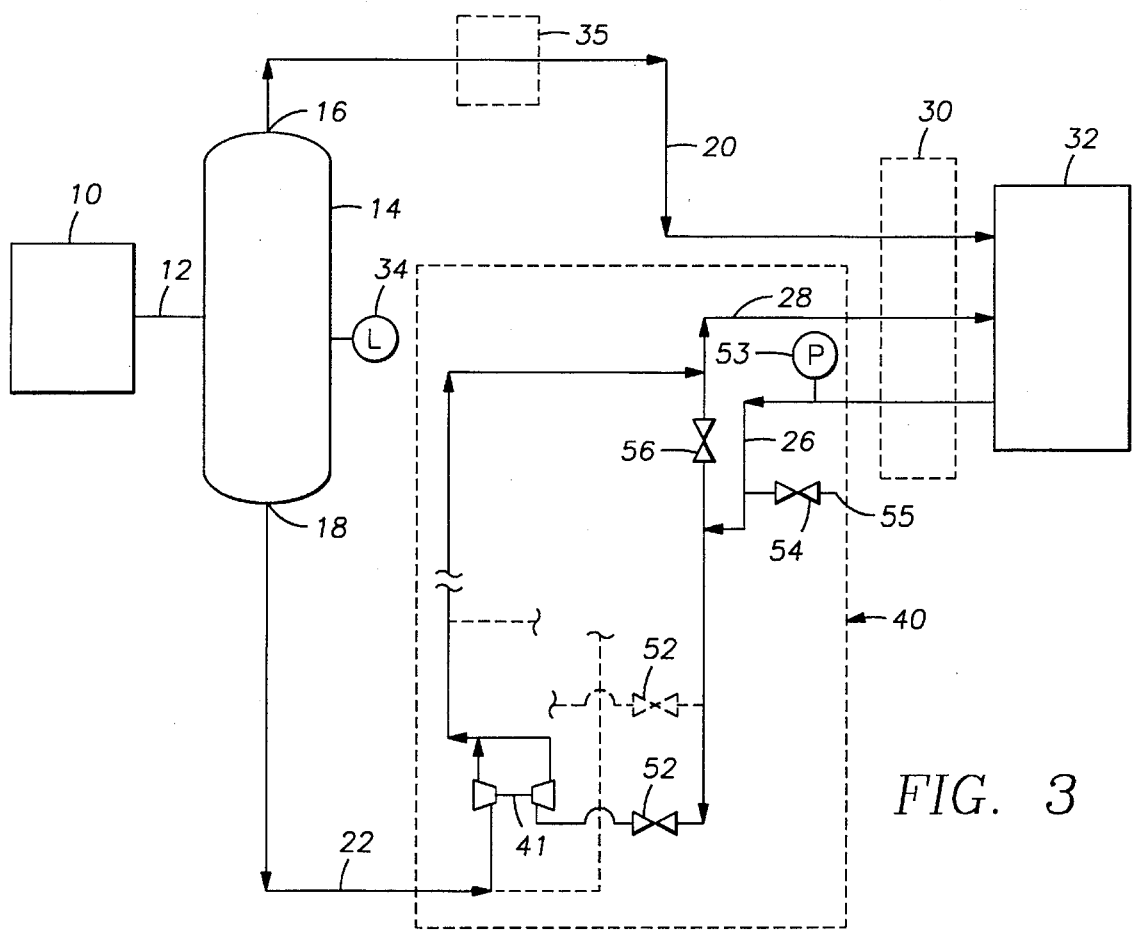
FIG. 3 is a schematic diagram of an alternative embodiment of the invention wherein hydraulic pumps introduce recovered liquid hydrocarbon into a liquid flowline.
Figure 4:
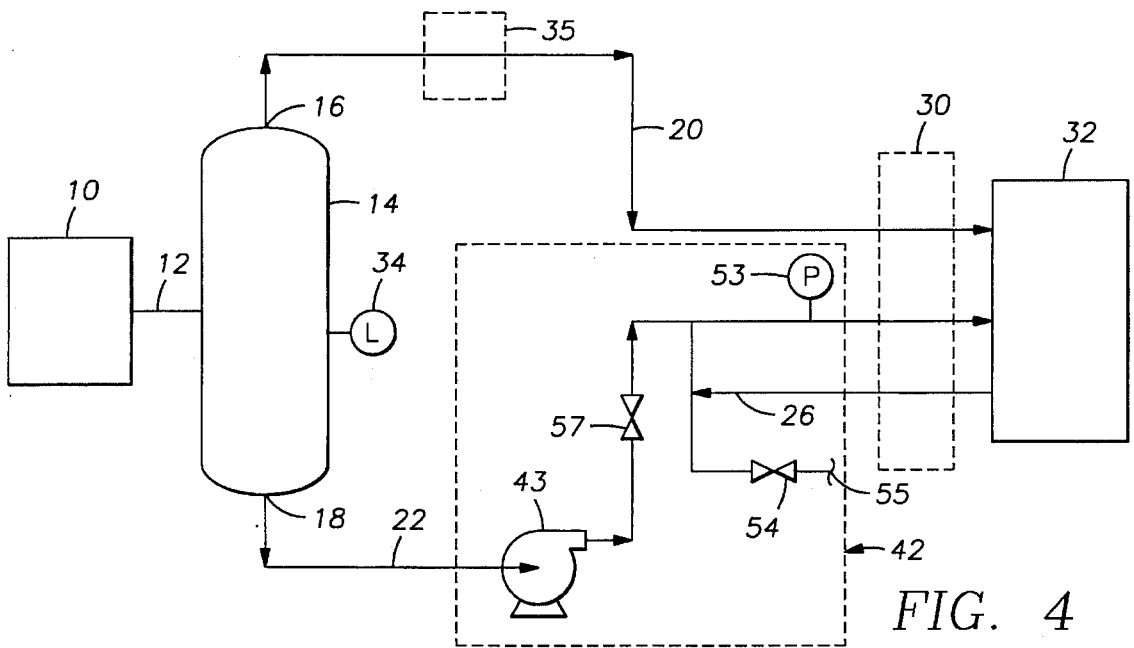
FIG. 4 is a schematic of an alternative embodiment wherein an electric pump is used to introduce recovered liquid hydrocarbon into a circulating liquid flowline through a manifold.

Alternatively, introducing device 24 can be an hydraulic pump system 40 as shown in FIG. 3, with one or more hydraulic pumps 41, or an electric motor pump system 42 as shown in FIG. 4, with one or more electric pumps 43. In FIG. 4 level sensor 34 can control starting or stopping of the pumps and/or flow throttle control valve 57. In all three cases, the backpressure on the separator is determined by the sum of the gas pressure drop in pipe 20, the outlet pressure of pipe 20 on platform 32 and the pressure required to overcome the weight of the column of gas in pipe 20. If lower pressures are required, a compressor could be installed at 35 in pipe 20.

The present invention has been described in terms of particular embodiments found or proposed to comprise preferred modes for the practice of the invention. It will be appreciated by those of skill in the art that, in light of the present disclosure, numerous modifications and changes can be made in the particular embodiments exemplified without departing from the intended scope of the invention. For example, the system may be configured to allow recycle liquid to circulate through the gas flowline to facilitate recirculation, to allow pigging the gas flowline in the event that the gas flowline becomes partially blocked, or the recycle flowline also can be used to inject liquid back into the well to keep the well bore, wellhead and separator warm in case of extended shut-in. All such modifications are intended to be included within the scope of the appended claims.

What is claimed is:

1. A device for recovering vapor and liquid hydrocarbons from a composite stream, comprising:
    a separator for receiving the composite hydrocarbon stream from a well and separating the received composite hydrocarbon stream into a liquid stream and vapor stream;
    a vapor flowline for conducting said vapor stream away from the separator, said vapor flowline being operably connected to said separator;
    a circulating loop comprising a recycle flowline and a liquid flowline;
    an introducing means for introducing said liquid hydrocarbon stream into said circulating loop;
    means for removing liquid from said circulating loop; and
    a pipe for conducting said liquid stream from said separator to said introducing means, said pipe being operably connected to said separator and to said introducing means.

2. The hydrocarbon recovery device according to claim 1 wherein a recycle liquid flows through said recycle flowline and returns through said liquid flowline.

3. The hydrocarbon recovery device according to claim 2, further including means for heating said recycle liquid to a selected temperature before it flows into said recycle flowline.

4. The hydrocarbon recovery device according to claim 1 wherein said recycle liquid passes through said introducing means and reduces the backpressure on the well.

5. The hydrocarbon recovery device according to claim 4 wherein said introducing means comprises an eductor.

6. The hydrocarbon recovery device according to claim 4 wherein said introducing means is a pump.

7. The hydrocarbon recovery device according to claim 6 wherein said pump is a hydraulic pump.

8. The hydrocarbon recovery device according to claim 6 wherein said pump is an electric pump.

9. The hydrocarbon recovery device according to claim 1, further including a level control means for controlling the liquid level in said separator.

10. A method of recovering hydrocarbons from a well, comprising the steps of:
    receiving a composite hydrocarbon stream from a well into a separator and
    separating the received composite stream into a vapor stream and liquid stream,
    flowing the vapor stream from the separator through a vapor flowline;
    circulating a recycle liquid through a circulating loop comprising a recycle
    flowline and a liquid flowline;
    flowing said liquid stream from said separator to an introducing means for introducing said liquid stream into said circulating loop.

11. The method of claim 10, further comprising the step of heating the recycle liquid to a selected temperature before flowing said recycle liquid through said recycle flowline.

12. The method of claim 10, further comprising the step of pressurizing the fluid prior to its introduction into the circulating loop.

13. A hydrocarbon recovery device comprising an apparatus through which recovered liquid hydrocarbons flow from a wellhead to an eductor operably attached to a circulating loop, wherein liquid from said circulating loop flows through said eductor and reduces pressure on the well.

* * * * *